United States Patent
Bandyopadhyay et al.

(10) Patent No.: US 9,479,948 B2
(45) Date of Patent: Oct. 25, 2016

(54) SYSTEM AND METHOD FOR ADAPTING CHARACTERISTICS OF APPLICATION LAYER PROTOCOL USING SENSED INDICATION

(71) Applicant: Tata Consultancy Services Limited, Maharashtra (IN)

(72) Inventors: Soma Bandyopadhyay, West Bengal (IN); Abhijan Bhattacharyya, West Bengal (IN); Arpan Pal, West Bengal (IN)

(73) Assignee: TATA CONSULTANCY SERVICES LIMITED, Mumbai, Maharashtra (IN)

( * ) Notice: Subject to any disclaimer, the term of this patent is extended or adjusted under 35 U.S.C. 154(b) by 123 days.

(21) Appl. No.: 14/310,169

(22) Filed: Jun. 20, 2014

(65) Prior Publication Data

US 2014/0376384 A1    Dec. 25, 2014

(30) Foreign Application Priority Data

Jun. 22, 2013 (IN) .......................... 2109/MUM/2013

(51) Int. Cl.
*H04W 24/02* (2009.01)
*H04W 84/18* (2009.01)
*H04Q 9/02* (2006.01)

(52) U.S. Cl.
CPC ............. *H04W 24/02* (2013.01); *H04Q 9/02* (2013.01); *H04W 84/18* (2013.01); *H04Q 2213/092* (2013.01); *H04Q 2213/166* (2013.01); *H04Q 2213/332* (2013.01)

(58) Field of Classification Search
CPC .............................. H04W 24/02; H04W 84/18
See application file for complete search history.

(56) References Cited

U.S. PATENT DOCUMENTS

| | | | |
|---|---|---|---|
| 8,310,394 B2 | 11/2012 | Kim | |
| 2007/0150565 A1* | 6/2007 | Ayyagari | H04L 67/12 709/223 |
| 2009/0224941 A1* | 9/2009 | Kansal | H04Q 9/00 340/870.06 |
| 2009/0322518 A1* | 12/2009 | Liang | H04L 45/48 340/539.18 |
| 2010/0148940 A1* | 6/2010 | Gelvin | H04L 67/12 340/286.02 |

FOREIGN PATENT DOCUMENTS

| | | | | |
|---|---|---|---|---|
| CN | 101442459 A | 5/2009 | | |
| EP | 1664742 A2 | 6/2006 | | |
| EP | 2120181 A1 * | 11/2009 | ......... | G06K 9/00979 |

\* cited by examiner

*Primary Examiner* — Chi H Pham
*Assistant Examiner* — Shailendra Kumar
(74) *Attorney, Agent, or Firm* — Thompson Hine LLP

(57) ABSTRACT

A system and method for resource utilization in a constrained sensor gateway for transfer of data in terms of the bandwidth and energy available to transfer data. The system includes a processor in communication with the constrained sensor gateway, which includes an application layer protocol and which is in communication with a communication network, and a memory coupled to the processor. The memory includes a network condition detection module configured to detect a network condition of the constrained sensor gateway, and an adaption module configured to determine a reliability score. The application layer protocol of the constrained sensor gateway adapts a reliability level based on the reliability score determined by the adaption module, which enables better utilization of the bandwidth and energy to transfer data. The reliability level may pertain to a reliable mode, or a non-reliable mode of communication for transferring data.

8 Claims, 4 Drawing Sheets

SYSTEM AND METHOD FOR ADAPTING CHARACTERISTICS OF APPLICATION LAYER PROTOCOL USING SENSED INDICATION

RELATED APPLICATIONS

This application claims the benefit of Indian patent application No. 2109/MUM/2013, filed Jun. 22, 2013.

TECHNICAL FIELD

The present subject matter described herein, in general, relates to sensors connected through a constrained sensor gateway, and more particularly to a system and method for optimizing network bandwidth and energy utilization of the constrained sensor gateway.

BACKGROUND

Conventional systems for monitoring and controlling require the physical presence of the operator at the location. However, with developments in sensor technology, the operators are able to remotely control and monitor systems. The advantage of remote monitoring and controlling has fuelled the expansion for the use of sensors for non-industrial purposes too.

With the expansion in the use of sensors for non-industrial purposes, the number of sensors gathering information pertaining to certain parameters also increased exponentially. Undesirably, this resulted in increased usage of bandwidth as well as energy as all the sensors were continuously interacting with a backend database. Additionally, since the sensors were located remotely, the sensor gateway connecting the sensors to the backend database demanded continual energy supply. This posed a major drawback when the sensor(s) and sensor gateways are constrained in terms of usage of network bandwidth as well as energy for exchanging sensed data.

Sensors/sensor-gateways are applied for realizing different domain of applications. Further these sensed data are transferred to the backend database nodes. The sensor or sensor gateway has a communication module having an application layer protocol. However, the application layer protocol does not depend on the situation obtained from the sensor data.

Hence, the suggested system and method could not effectively solve the problem of optimizing the bandwidth energy usage by becoming situation aware.

SUMMARY

This summary is provided to introduce aspects related to systems and methods for optimizing resource utilization of network bandwidth and energy by a constrained sensor gateway. The aspects are further described below in the detailed description. This summary is not intended to identify essential features of the claimed subject matter nor is it intended for use in determining or limiting the scope of the claimed subject matter.

In one implementation, a system for optimizing resource utilization, i.e. bandwidth and energy, for constrained sensors in an environment has been disclosed. The system may comprise a network condition detection module. The network condition detection module can detect one or more network conditions of the communication network utilized by the constrained sensor gateway. The system may further comprise an adaptation module configured to dynamically determine a reliability score. The reliability score may be based upon inferred sensed indication. The reliability score may enable dynamic selection of reliable mode, or a non-reliable mode for transferring the data based on sensed indication. The application layer protocol may adapt its data transfer characteristics e.g. switching between different reliability modes based upon the reliability score.

In one implementation, a method for optimizing resource utilization for constrained sensors in a smart environment is disclosed. The method discloses detection of network condition of the communication network used by the constrained sensor gateway. The method may analyze sensed data to derive sensed indication. Further, the method may derive sensed indication by analysing sensed data, and the network condition of the constrained gateway. According to the method disclosed, a reliability score is determined based on the inferred sensed indication. Further, an application layer protocol dynamically adapts a reliability level for transfer of data.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
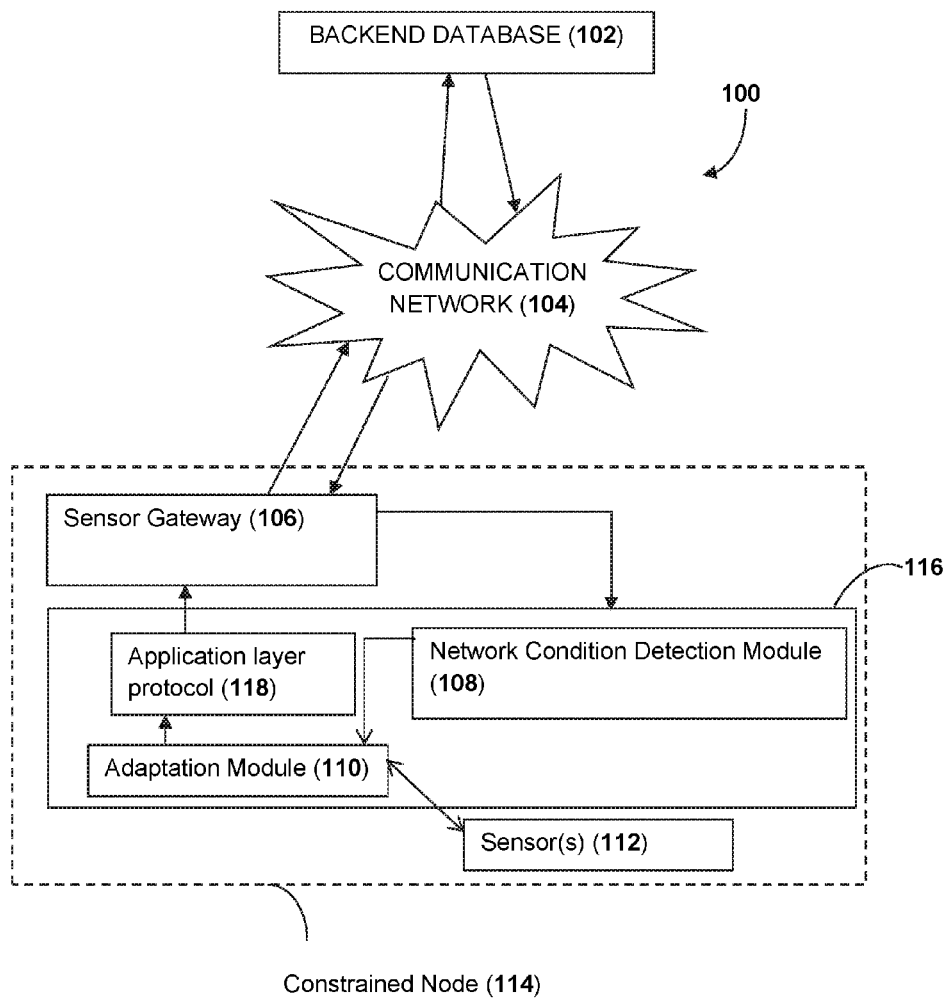
FIG. 1 illustrates a system in accordance with an embodiment of the present subject matter.

System and method for resource utilization in a constrained sensor gateway for transfer of data is demonstrated. The present subject matter discloses an adaptation of application layer protocol characteristics for transfer of data based upon inferred sensed indication and network condition. The adaption of the application layer protocol reduces handshake between sensors and a server and hence, reduces the resource utilization such as usage of network bandwidth, and energy for communication.

The present subject matter discloses an application layer protocol of a constrained sensor gateway configured to adapt a reliability level based upon the inferred sensed indication. The inferred sensed indication may refer to an obtained indication by analysing the sensed data, or a combination of the network condition of the constrained sensor gateway and the indication by analysing the sensed data. Moreover, the sensed data may be captured by sensors communicably connected with the constrained sensor gateway. The sensed data may have context specific attributes based on environment in which the sensors are deployed, for example in vehicle tracking, in medical monitoring systems or in other similar applications.

Further, the inferred sensed indication may be affected by the network condition of the constrained sensor gateway. Thereby deriving a sensed indication from the combination network condition of the constrained sensor gateway and the sensed data. The network condition of the constrained sensor gateway may refer to bandwidth availability, round-trip latency, and the like. Based on the inferred sensed indication, a reliability score may be determined for transfer of data. Further, based on the reliability score, the application layer protocol embedded in the constrained sensor gateway may adapt the reliability level. The reliability level may refer to reliable mode of communication, or non-reliable mode of communication. Based on multiple layers of reliability, multiple numbers of handshaking for transfer of data may be determined. For example, reliability score of 0 for non-reliable mode, 1 for medium-reliable mode, and 2 for highest-reliable mode for transfer of data, may be determined. Further, the reliability level, i.e., reliable mode or non-reliable mode, may be selected dynamically based on the reliability score. The selection of reliability level reduces the number of handshakes associated with data transfer in a transaction. The reduction in handshaking may enable more effective use of resources utilized by the constrained sensors.

In another embodiment, the application layer protocol may be associated with an initial characteristic. The initial characteristic may be configured to transform into an adapted characteristic based upon reliability score received from an adaption module. The adaption module may be embedded on a memory, wherein the memory may be coupled to a processor. The adaption module determines a reliability score for transactions, i.e., transfer of data. The reliability score is determined by the adaption module based on the inferred sensed indication. The inferred sensed indication is derived from analyzing sensed data and/or the network condition of the constrained sensor gateway. The sensed data may help to determine the reliability mode required for transfer of data. The reliability mode may refer to reliable mode of data transfer, or non-reliable mode of data transfer; the reliability mode may also be defined as the adapted characteristic. Further, the inferred sensed data is derived by capturing data from a plurality of sensors connected to the constrained gateway. The plurality of sensors and the data captured has context specific attributes, i.e., the sensors and data captured depends upon the environment in which the sensors are deployed.

In another embodiment, the adaption module detects the reliability score in terms of reliable mode, and non reliable mode of data transfer. The adaption module may use the inferred sensed indication, by analyzing retrieved sensor data to detect a situation, and makes a decision as to which mode of data transfer is suitable to reduce the costs associated with the communications. Alternately, the adaptation module may use the inferred sensed indication and network condition together to judge the situation of data delivery to determine whether the reliable mode adds more cost to the system, or not. This in turn improves its various performance parameters such as reduction in latency of data transaction, efficient bandwidth usage etc.

According to one embodiment, an application layer protocol module adapts a characteristic based on the sensed indication, or combining the detected network condition along with the sensed indication. The sensed indication may be derived from analyzing the sensor data. The sensed indication is contextual information based on the environment condition, wherein the environment condition may refer to systems in which the sensors are deployed, e.g., in vehicle tracking or medical monitoring systems.

While aspects of the system and method for resource utilization in a constrained sensor gateway for transfer of data are described, they may be implemented in any number of different computing systems, environments, and/or configurations. The embodiments are described in the context of the following exemplary system.

Referring now to FIG. 1, a system 100 illustrating a constrained node 114 communicating with a backend database 102 is depicted. The constrained node 114 may also communicate with other constrained nodes and backend nodes over the communication network 104. The constrained node 114 may utilize a constrained sensor gateway 106. The constrained sensor gateway may be constrained in terms of bandwidth and energy available.

The system 100 may further comprise of a network condition detection module 108 configured to detect one or more network conditions of the communication network 104. The network conditions can be detected in terms of bandwidth availability, round trip latency, and the like. The network detection module 108 is configured to transfer details related to the network condition of the communication network 104, used by the constrained sensor gateway 106, to an adaption module 110. The adaptation module 110 may be further configured to receive sensed data from at least one sensor 112. The sensor 112 according to an embodiment may be embedded in the constrained node 114.

The sensed data captured by the sensor 112 includes context specific attributes based on the environment in which it is deployed. The adaptation module 110 based on the sensed data determines an inferred sensed indication. Based on the inferred sensed indication, a reliability score for the transfer of the data is assigned. According to one embodiment, the adaption module 110 determines the reliability score based on a combination of the network condition and the sensed data, which may also be termed as the inferred sensed indication.

Based on the reliability score determined by the adaption module 110, an application layer protocol 118, which may be embedded in the constrained sensor gateway 106, adapts a reliability level. In the embodiment depicted in FIG. 1, both the application layer protocol 118 and the adaptation module 110 are part of a communication module 116. The reliability level may pertain to a reliable mode or non-reliable mode of communication. In an exemplary embodiment, when the application layer protocol 118 adapts a non-reliable mode of communication for transfer of data, the application layer protocol 118 utilizes an open loop communication, without a feedback.

Further, according to the exemplary embodiment of FIG. 1, the adaption module 110, the network condition detection module 108, and the application layer protocol 118 may all reside in the communication module 116. The communication module 116 may enable communication between the backend database 102 and other constrained nodes.

Figure 2:
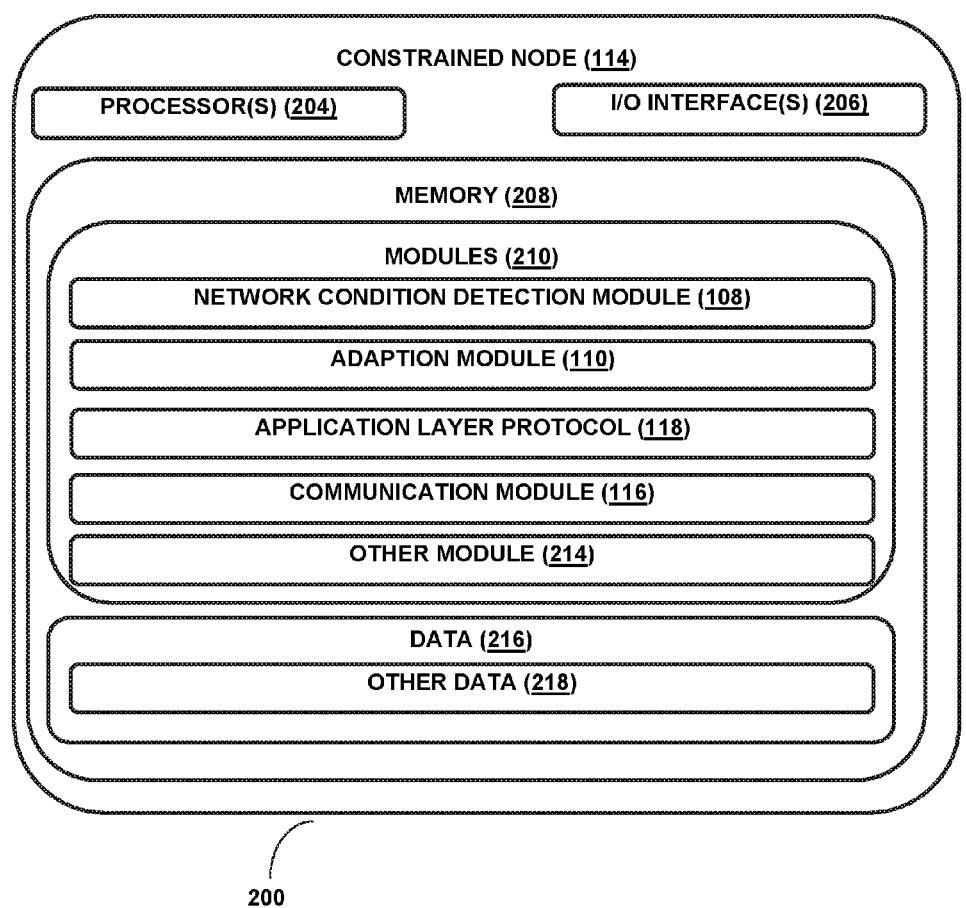
FIG. 2 illustrates a constrained node in accordance with an embodiment of the present subject matter.

Referring now to FIG. 2, the constrained node 114 is illustrated in accordance with an embodiment of the present subject matter. In one embodiment, the constrained node 114 may include at least one processor 204, an input/output (I/O) interface 206, and a memory 208. The at least one processor 204 may be implemented as one or more microprocessors, logic circuitries, and/or any devices that manipulate signals based on operational instructions. Among other capabilities, the at least one processor 204 is configured to fetch and execute computer-readable instructions stored in the memory 208.

The I/O interface 206 may include a variety of software and hardware interfaces, for example, a web interface, a graphical user interface, and the like. The I/O interface 206 may allow the constrained node 114 to interact with a user directly or through the client devices (Not Shown). Further, the I/O interface 206 may enable the constrained node 114 to communicate with other devices. The I/O interface 206 can facilitate multiple communications within a wide variety of networks and protocol types, including wired networks, for example, LAN, cable, etc., and wireless networks, such as WLAN, cellular, or satellite. The I/O interface 206 may include one or more ports for connecting a number of devices to one another or to a server.

Additionally, the I/O interface 206 may be connected to at least one sensor (labelled in FIG. 1). The at least one sensor is configured to capture sensed data pertaining to certain parameters based on environment in which the at least one sensor is deployed. The data can have context specific attributes based on the environment. The I/O interface 206 may also be configured to perform as a constrained sensor gateway, which enables communication or data transfer between the constrained node 114 and backend database 102 of FIG. 1. The constrained sensor gateway may be constrained in terms of bandwidth available for communication/transfer of data or energy available for the constrained sensor gateway.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, and flash memories. The memory 208 may include modules 210 and data 216.

The modules 210 include routines, programs, objects, components, data structures, etc., which perform particular tasks or implement particular abstract data types. In one implementation, the modules 210 may include a network condition detection module 108, an adaptation module 110, an application layer protocol 118, communication module 116 and other modules 214. The other modules 214 may include programs or coded instructions that supplement applications and functions of the constrained node 114.

The data 216, amongst other things, serves as a repository for storing data processed, received, and generated by one or more of the modules 210. The data 216 may also include other data 218. The other data 218 may include data generated as a result of the execution of one or more modules in the other module 214.

According to one exemplary embodiment, the communication module 116 includes the adaption module 110, the network condition detection module 108, and the application layer protocol 118.

In another embodiment, the constrained node 114 comprises the adaption module 110. The adaption module 110 may be configured to determine a reliability score for the transfer of data. The reliability score determined by the adaption module 110 is based on an inferred sensed indication. The inferred sensed indication may be derived by analyzing an inferred sensed data and network condition of the communication network of the constrained sensor gateway 106. The network condition may pertain to the bandwidth available for the transfer of data, and roundtrip latency detected by the network condition detection module 108. In an exemplary embodiment, the condition can be detected by using a cross layer system for bandwidth aggregation. The cross layer system may be based on dynamic analysis of network conditions as described in PCT/IN2011/000838. Further, a person skilled in the art may also be able to detect network condition by systems and methods as described in patent application PCT/IN2009/000281, and 2493/MUM/2012.

The inferred sensed data may be obtained or derived from the sensed data. The sensed data may have context specific attributes. The inferred sensed data may determine the reliability level requirement for the transfer of data based on the attributes of the sensed data. The reliability level may refer to at least one of reliable mode, or non-reliable mode of communication for transfer of data.

The application layer protocol 118 dynamically adapts the reliability level based on the score determined by the adaption module 110 for transfer of data. The dynamic adaption by the application layer protocol 118 enables optimization of use of resources, such as bandwidth and energy. The dynamic adaption of the reliability level helps the application layer protocol 118 reduce the handshaking between the devices, or the server and the device thereby improves the resource utilization of the system 100.

Figure 3:
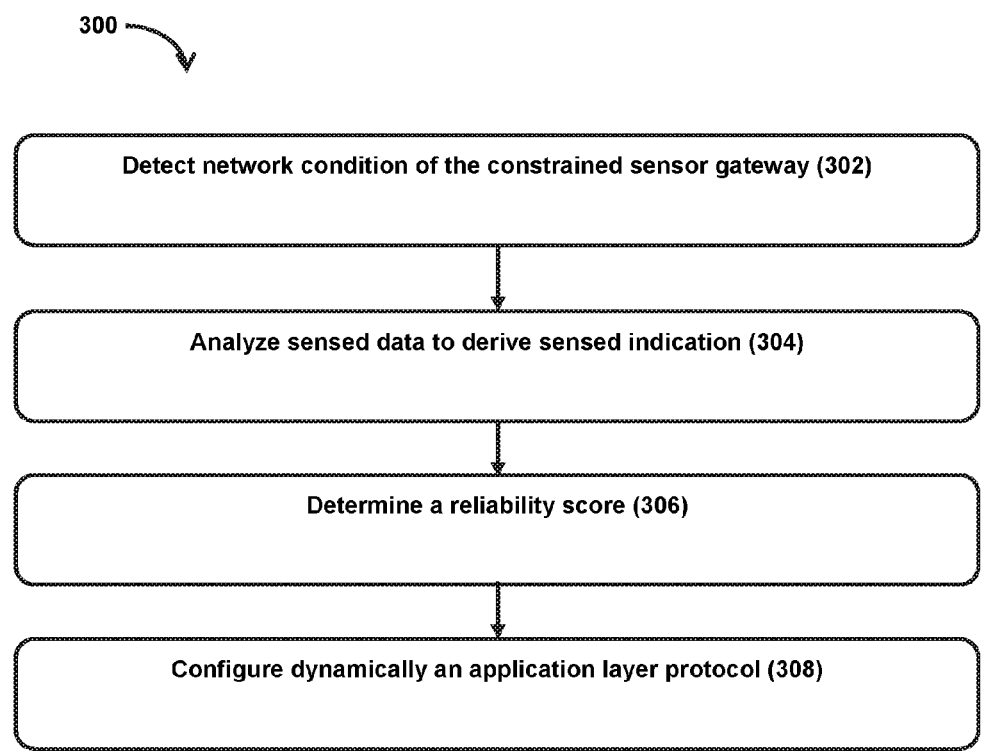
FIG. 3 illustrates a flow chart in accordance with an embodiment of the present subject matter.

Referring now to FIG. 3, a flow chart in accordance with an embodiment of the present subject matter is presented.

At block 302, a network condition of a communication network used by a constrained sensor gateway is detected. The network condition is detected by the network condition detection module 108 of FIG. 2. The condition detected may refer to the bandwidth available for transfer of data, roundtrip latency, and the like. Further at block 304, an analysis is performed on sensed data to derive a sensed indication. At block 304, further analysis is also performed, including analysis of a network condition detected by the network condition detection module 108 to derive an inferred sensed indication. At block 306 a reliability score is determined based on either analysis of the sensed data or a combination of the network condition and indication derived from the sensed data. The reliability score is determined by the adaptation module 110.

At block 308 an application layer protocol 118 dynamically adapts a reliability level based on the reliability score determined by the adaption module 110.

Figure 4:
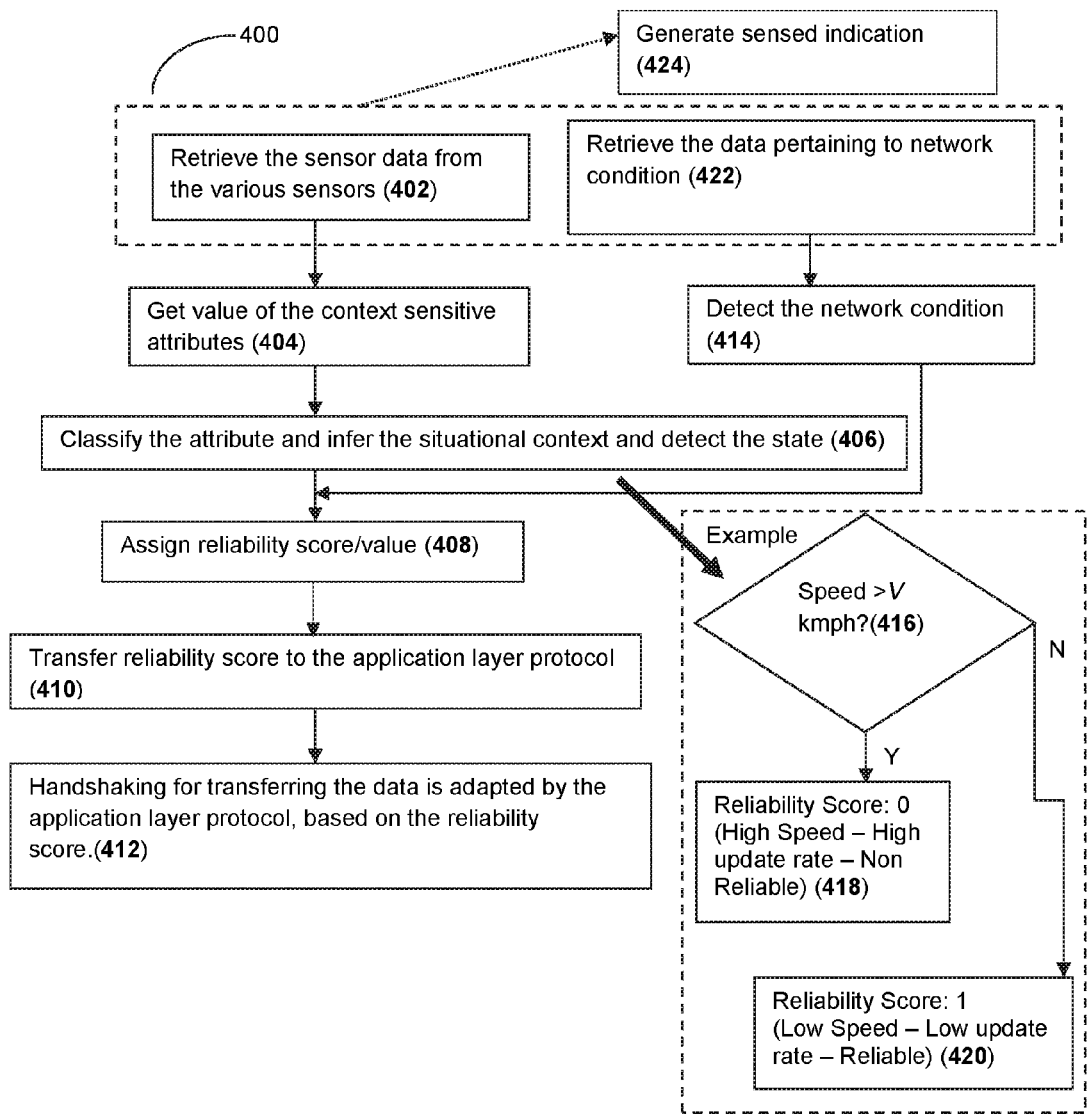
FIG. 4 is a block diagram illustrating process flow in accordance with an embodiment of the present subject matter.

Referring to FIG. 4, a block diagram illustrating process flow 400 in accordance with an embodiment of the present subject matter is shown. The process 400 is initiated at step 302 of FIG. 3, wherein sensed data is captured/retrieved from the sensors 112 embedded in edge devices having a constrained sensor gateway 106 as depicted in FIG. 1. In step 422 data pertaining to a network condition is retrieved. The combination of step 402, or step 402 and step 422 generates an inferred sensed indication for the constrained sensor gateway 106.

The sensors 112 embedded in the edge devices may differ based on the applicability for a specific domain, e.g., vehicle tracking, data centre monitoring, or medical monitoring. At step 404, values of context sensitive attributes is captured. The context sensitive attributes can also be termed as decision attributes serving the specific domain. The data from the context sensitive attributes and state of the context sensitive attributes is detected in the step 406. An example for step 406 is illustrated using step 416, step 418 and step 420.

The detection of the context sensitive attributes and state of the context sensitive attributes may be followed by step 408. At step 408 a reliability score is determined. The reliability score may be a function of time, a network condition of the constrained gateway 106, and/or a state of the constrained gateway based on the inferred sensed indication. The network condition detected at step 414 may also determine the reliability score assigned in step 408. The reliability score may be based upon the specific domain, in order to optimize bandwidth and energy usage of the edge devices for a particular situation. At step 410 the reliability score is transferred to the application layer protocol 118 of the edge devices. Further at step 412, the application layer protocol 118 adapts handshaking required during data transfer as per the reliability score.

The example illustrated in step 416, step 418 and step 420 are explained herein with respect to an intelligent transport system for tracking a vehicle. In the exemplary embodiment a dashboard of each vehicle is equipped with a sensor gateway. The sensor gateway may be embedded with sensors such as a global positioning system (GPS) and/or an accelerometer. The sensor gateway may use multiple communication methods selected from general packet radio service (GPRS), Wi-Fi, and Ethernet, to connect to Internet. The sensor gateway and the communication network can draw energy from the vehicle battery.

For a remote user to track the vehicle the accelerometer data and GPS coordinates are collected over a stipulated time interval and updated into a server by the gateway. The server can generate vehicle tracking information with its ID, location and speed inferred from the received GPS data and accelerometer data of the vehicle. However, the update interval for the server and time interval of collecting data may vary depending upon the speed of the vehicle, i.e., when the vehicle is travelling faster, the time interval and update interval may be reduced. Therefore, if the vehicle is travelling faster, the server would be updated faster thereby consuming more bandwidth and energy. The higher consumption of bandwidth and energy is undesirable.

The present disclosure can be implemented in both scenarios arising as a result of the travelling of a vehicle, i.e., when the vehicle is travelling faster and when the vehicle is travelling slower. The update rate for receiving or sending data to or from the sensors is reduced as the rate of change of geographic co-ordinates decreases. When the vehicle is travelling at a lower speed it becomes important that all the coordinates and accelerometer data communicated by the sensor gateway must be successfully captured by the server as the next update will arrive after a long interval. Hence, in this case a reliable mode of transfer is required.

However, when the vehicle is travelling faster, the rate of update is higher as the rate of change in the co-ordinates is higher for the vehicle. At such a higher rate of updation, stray losses of updated information may not have adverse affect on the tracking system. However, since the rate of update is high, the handshake required to ensure reliability increases the network load and leads to network clogging. Also, the communications due to handshakes for reliability increases the energy usage and puts pressure on the energy source (battery) which is already stressed due to high rate of update. In this scenario the application layer protocol 118 adapts a non-reliable mode of transfer as acknowledge is deemed unnecessary. Thus, depending on the accelerometer data the sensor gateway can infer the state of the vehicle (static, slow, fast, etc.) and decide on whether to go for reliable mode or un-reliable mode, i.e., adapt the data transfer characteristics to conserve the bandwidth and energy usage.

We claim:

1. A system for resource utilization in a constrained sensor gateway for transfer of data, the system comprising:
    a processor in communication with the constrained sensor gateway including an application layer protocol and the constrained sensor gateway is in communication with a communication network; and
    a memory coupled to the processor, wherein the memory comprises a plurality of modules being executed by the processor, and wherein the plurality of modules comprise:
    a network condition detection module that detects a network condition of the communication network; and
    an adaption module configured to dynamically determine a reliability score based on an inferred sensed indication for transfer of data, wherein the inferred sensed indication is determined by analyzing at least one of sensed data, or a combination of the network condition and an indication derived by analyzing the sensed data,
    wherein based on the reliability score the application layer protocol of the constrained sensor gateway adapts a reliability level,
    wherein the reliability level pertains to at least one of reliable mode or non-reliable mode of communication for transfer of the data.

2. The system of claim 1, wherein the constrained sensor gateway is communicably connected to at least one sensor, wherein the at least one sensor captures sensed data having context specific attributes.

3. The system of claim 1, wherein the network condition of the constrained sensor gateway is detected for at least one of bandwidth availability, and round-trip latency.

4. The system of claim 1, wherein the non-reliable mode of communication for transfer of the data adapted by the application layer protocol utilizes an open loop communication, without a feedback and the reliable mode of communication for transfer of the data, adapted by the application layer protocol utilizes a closed loop communication, with a feedback.

5. A method for resource utilization in a constrained sensor gateway for transfer of data, the method comprising:
    detecting, by a processor, the network condition of the communication network, wherein the constrained sensor gateway includes an application layer protocol and the constrained sensor gateway is in communication with a communication network;
    analyzing, by the processor, the sensed data to derive a sensed indication and the network condition;
    determining, by the processor, the reliability score based on an inferred sensed indication, wherein the inferred sensed indication is based on at least one of the sensed indication or a combination of the network condition and the sensed indication; and
    configuring dynamically the application layer protocol to adapt a reliability level for the transfer of data based on the reliability score, wherein the reliability level pertains to at least one of reliable mode or non-reliable mode of communication for transfer of the data.

6. The method of claim 5, wherein capturing the sensed data having context specific attributes from at least one sensor communicably connected to the constrained sensor gateway.

7. The method of claim 5, wherein the network condition of the constrained sensor gateway is detected for at least one of bandwidth availability, and round-trip latency.

8. The method of claim 5, wherein the non-reliable mode of communication for transfer of the data adapted by the application layer protocol utilizes an open loop communication, without a feedback and the reliable mode of communication for transfer of the data, adapted by the application layer protocol utilizes a closed loop communication, with a feedback.

* * * * *